(12) United States Patent
Bull et al.

(10) Patent No.: US 12,236,698 B2
(45) Date of Patent: Feb. 25, 2025

(54) SYSTEM AND METHOD FOR REMOTE ASSET TAGGING AND MANAGEMENT

(71) Applicant: TOSHIBA TEC KABUSHIKI KAISHA, Tokyo (JP)

(72) Inventors: Matthew Bull, Canandaigua, NY (US); Kevin Peters, Eagan, MN (US); Catherine Barczak, Rochester, NY (US); Scott Robinson, Richmond, VA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 17/874,504

(22) Filed: Jul. 27, 2022

(65) Prior Publication Data

US 2023/0034748 A1 Feb. 2, 2023

Related U.S. Application Data

(60) Provisional application No. 63/388,392, filed on Jul. 12, 2022, provisional application No. 63/226,432, filed on Jul. 28, 2021.

(51) Int. Cl.
*G06V 30/22* (2022.01)
*G06K 19/06* (2006.01)
*G06V 30/224* (2022.01)

(52) U.S. Cl.
CPC ..... *G06V 30/224* (2022.01); *G06K 19/06037* (2013.01)

(58) Field of Classification Search
CPC ............ G06V 30/224; G06K 19/06037; G06F 3/1204; G06F 3/1224; G06F 3/1285
USPC ......................................................... 382/182
See application file for complete search history.

(56) References Cited

U.S. PATENT DOCUMENTS

| | | | |
|---|---|---|---|
| 2013/0100501 A1* | 4/2013 | Chen | H04N 1/0036 358/1.14 |
| 2013/0215467 A1* | 8/2013 | Fein | H04W 4/80 358/1.15 |
| 2014/0376051 A1* | 12/2014 | Oguma | G06F 3/1204 358/1.15 |
| 2017/0193417 A1* | 7/2017 | Syed | G06Q 10/087 |

* cited by examiner

*Primary Examiner* — Neil R McLean
(74) *Attorney, Agent, or Firm* — UB Greensfelder LLP

(57) ABSTRACT

A system and method for asset registration and tagging includes determining candidate devices on a network or subnet. Device information is pulled from discovered devices. Device records are stored with device information including device serial number, model number, asset ID and service record information. A QR code is generated and displayed or printed at each discovered device. A device user scans the QR code to supply location information, as well as other user input, which is added to the device information. A device is then registered and an asset tag is printed at the device with instructions to affix it on an exterior for future reference.

20 Claims, 10 Drawing Sheets

DO NOT DISCARD ! ! !  500

This page printed by County School IT Business Solutions to assist with service and supply needs.

This printer is enrolled in the TBS Managed Print Services program. This asset tag will provide the information needed for supplies or service.

Scan this QR code to register your printer →  524

Please scan the above QR Code with your smartphone to register your printer. If you have any questions, please reach out to:

John Smith - john.smith @countyschools .edu ~528

532

Please cut out the attached tag and affix to the printer where it can be seen easily.

---

504 — Model: eStudio 2515AC
506 — Asset ID: XYZ123
512 — Serial Number: 20180609
516 — Service Number: 661009

Please cut out the tag along the line and tape securely to the printer in a visible location.

Toner is shipped automatically for this device ~520

FIG. 5

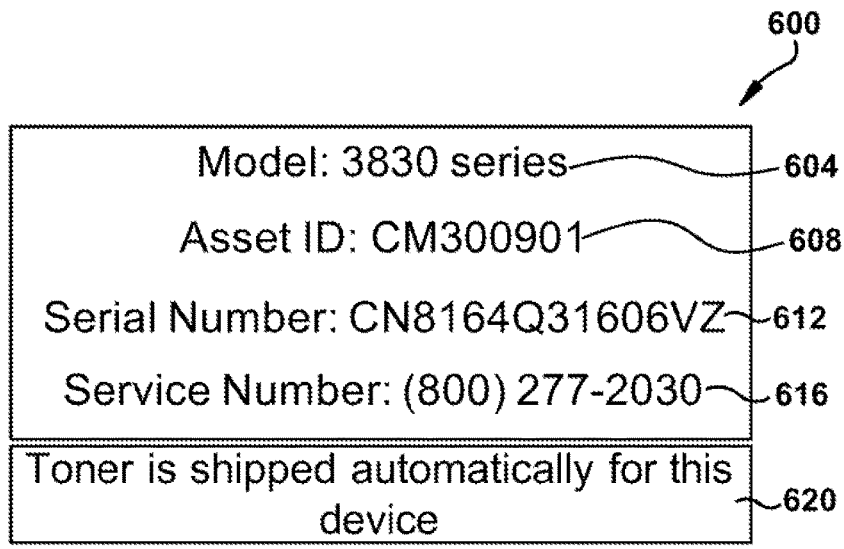

FIG. 6

DEVICE REGISTRATION ON SMARTSHEET

Serial Number ( Located on the back of the printer) *
123abc

Make/Model ( Located on the front of the printer) *
123abc

Select address where the printer is located *

Select or enter value

Room

Your Contact Email

Printed ID Tag ( On the page printed at the printer)

☐ Send me a copy of my responses

Submit

County Schools Device Registration
County Schools Device

FIG. 7

ASSET ASSESSMENT WORKFLOW

County Schools Device Registration

Serial Number ( Located on the back of the printer ) *
abc123

Make/Model ( Located on the front of the printer ) *
123abc

Select address where the printer is located *
Select or enter value

Room

Your Contact Email

Printed ID Tag ( On the page printed at the printer )

☐ Send me a copy of my responses

FIG. 11

SYSTEM AND METHOD FOR REMOTE ASSET TAGGING AND MANAGEMENT

TECHNICAL FIELD

This application relates generally to remote asset tagging and management. The application relates more particularly to remote initiation of an asset tag printout at multifunction peripherals for tagging and registration.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Multifunction peripherals are often managed by remote service providers. When a service provider is engaged to manage one or more MFPs for a customer, they typically send an agent on site to visit and register all devices. This process is expensive and time consuming. With businesses having fleets of MFPs, many devices must be manually registered and there is a significant risk that one or more devices will be missed.

BRIEF DESCRIPTION OF THE DRAWINGS

Various embodiments will become better understood with regard to the following description, appended claims and accompanying drawings wherein:

FIG. 5 illustrates an example embodiment of a template for asset management;

FIG. 6 illustrates an example embodiment of an asset tag suitably fixed on an exterior of a registered device;

FIG. 7 illustrates an example embodiment of device registration using a smartsheet;

FIG. 11 illustrates an example embodiment of an asset assessment workflow.

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Office machines, such as MFPs, are frequently managed and maintained as a fleet, frequently by third party service providers. When a site is assessed for device management, it is typically done with an onsite visit. In an example scenario, a two person team comprised of a company information technology technician and a distributor employee are dispatched to a site. The team must travel to the facility. They then complete a premises walk through to identify, catalog and mark each device with an identification tag. This can involve hours of costly human resource time. Example embodiments herein provide an asset management system that deploys templates to individual devices for automated tagging and registration of devices with minimal time requirements, minimal costs and improved accuracy.

Figure 1:
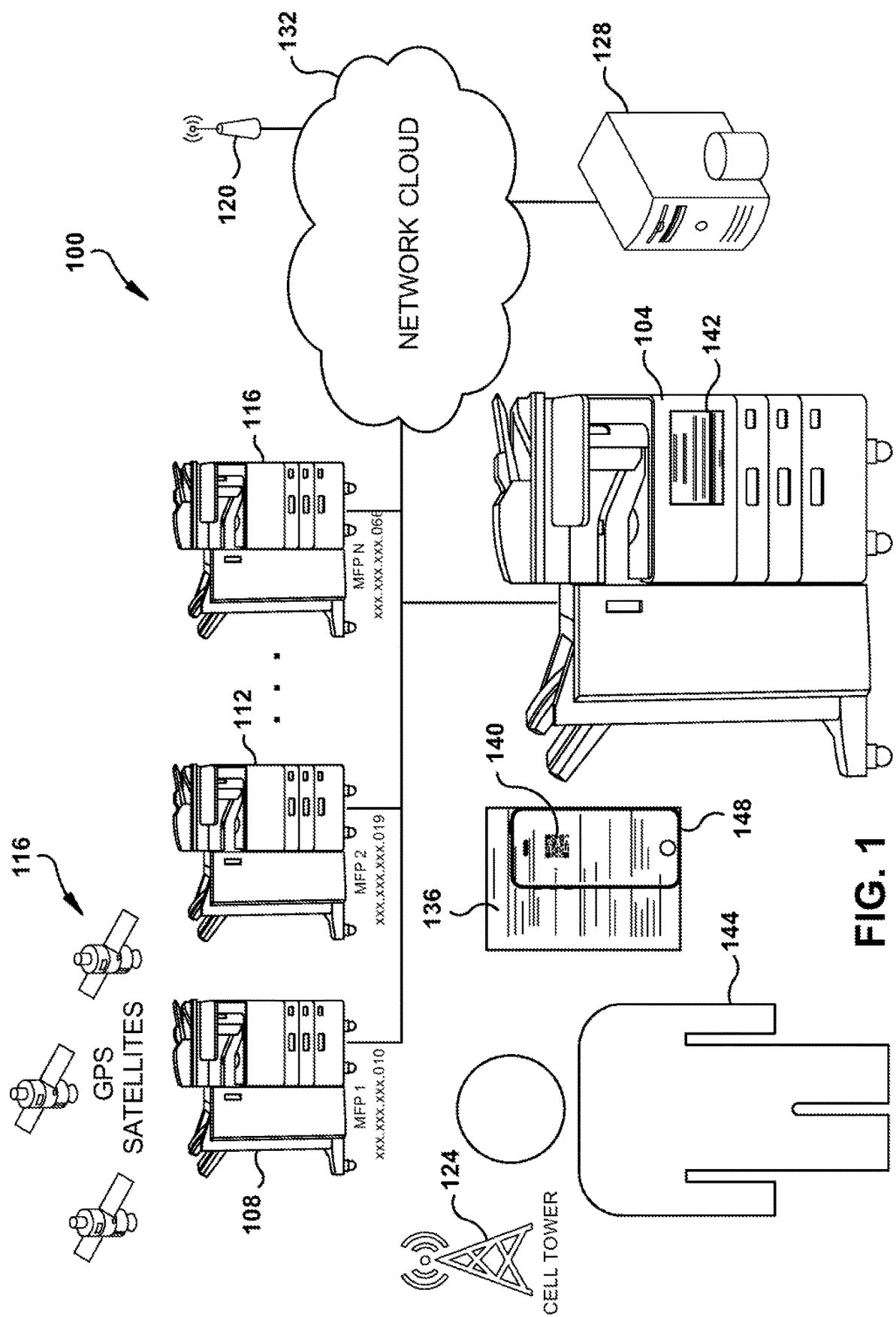
FIG. 1 illustrates example embodiment of a system for remote asset tagging and management.

FIG. 1 illustrates an example embodiment of a system 100 for remote asset tagging and management. Included are one or more MFPs, such as MFPs 104, 108, 112 and 118. In the illustrated example, the MFPs are dispersed at a single location, but it is to be understood that they may be deployed in multiple locations. MFP locations are suitably determined in accordance with any suitable positioning system, including positions established by an IP address, geolocation such as with GPS satellites 116, one or more Wi-Fi hotspots, such as Wi-Fi hotspot 120, or one or more cell towers, such as cell tower 124. The MFPs are in data communication with server 128 via network cloud, 132 comprised of any suitable wireless or wired data network. Network cloud 132 is suitably comprised of a local area network (LAN), a wide area network (WAN), which may comprise the Internet, or any suitably combination thereof. Server 128 identifies candidate devices by any suitable means, such as by checking devices in a particular subnet. Once candidate devices are determined, a template, such as template 136, is disposed for printing or display at each device. Included in template 136 is an encoded indicia, such as QR code 140. A user, such as user 144, scans the QR code with their tablet, smartphone, such as smartphone 148, or by using the MFP itself. This results in automated cataloging of the associated device and printing of an asset tag, such as asset tag 142, which can be affixed to the associated device. Details on generating templates and asset tags, as well as device cataloging, are provided further below. While QR codes are used in examples herein, it is to be understood that any suitable encoded indicia, including barcodes, or readable character indicia is suitably used.

Figure 2:
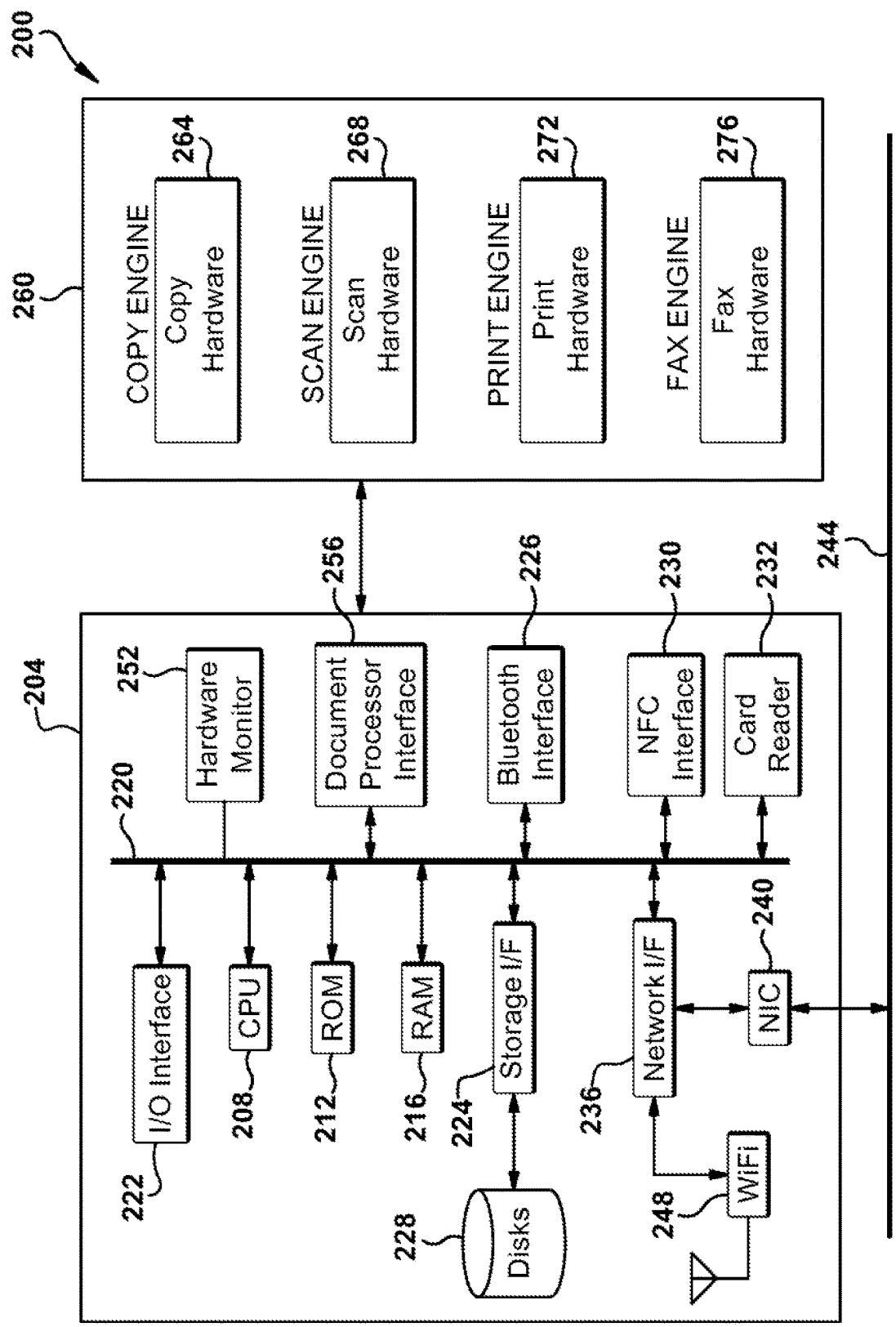
FIG. 2 illustrates an example embodiment of a networked digital device.

Turning now to FIG. 2, illustrated is an example embodiment of a networked digital device comprised of document rendering system 200 suitably comprised within an MFP, such as with MFPs 104, 108, 112 and 116 of FIG. 1. It will be appreciated that an MFP includes an intelligent controller 204 which is itself a computer system. Thus, an MFP can itself function as a server with the capabilities described herein. Included in intelligent controller 204 are one or more processors, such as that illustrated by processor (CPU) 208. Each processor is suitably associated with non-volatile memory, such as read-only memory (ROM) 212, and random access memory (RAM) 216, via a data bus 220.

Processor 208 is also in data communication with input/output interface 222, suitably comprising a user touchscreen.

While touchscreens are discussed in example embodiments herein, it is to be appreciated that any suitable user interface, such as keyboards, switches, displays, trackballs or mice may be used.

Processor 208 is also in data communication with a storage interface 224 for reading or writing to a storage 228, suitably comprised of a hard disk, optical disk, solid-state disk, cloud-based storage, or any other suitable data storage as will be appreciated by one of ordinary skill in the art.

Processor 208 is also in data communication with additional interfaces, such as Bluetooth interface 226, NFC interface 230 and card reader 232 for data exchange with proximity cards, such as card keys.

Processor 208 is also in data communication with a network interface 236 which provides an interface to a network interface controller (NIC) 240, which in turn provides a data path to any suitable wired interface or physical network connection 244, or to a wireless data connection via wireless network interface 248. Example wireless data connections include cellular, Wi-Fi, wireless universal serial bus (wireless USB), satellite, and the like. Example wired interfaces include Ethernet, USB, IEEE 1394 (FireWire), Lightning, telephone line, or the like.

Processor 208 can also be in data communication with any suitable user input/output (I/O) network interface 248 which provides data communication for interfacing with user peripherals, such as displays, keyboards, mice, track balls, touch screens, or the like. Processor 208 can also be in communication with hardware monitor 252, such as a page counter, temperature sensor, toner or ink level sensor, paper level sensor, or the like.

Also in data communication with data bus 220 is a document processor interface 256 suitable for data communication with the document rendering system 260, including MFP functional units. In the illustrated example, these units include a scan engine comprising copy hardware 264, a scan engine comprise of scan hardware 268, a print engine comprised of print hardware 272 and a fax engine comprised of fax hardware 276 which together comprise MFP document rendering system 260. It will be understood that functional units are suitably comprised of intelligent units, including any suitable hardware or software platform.

Figure 3:
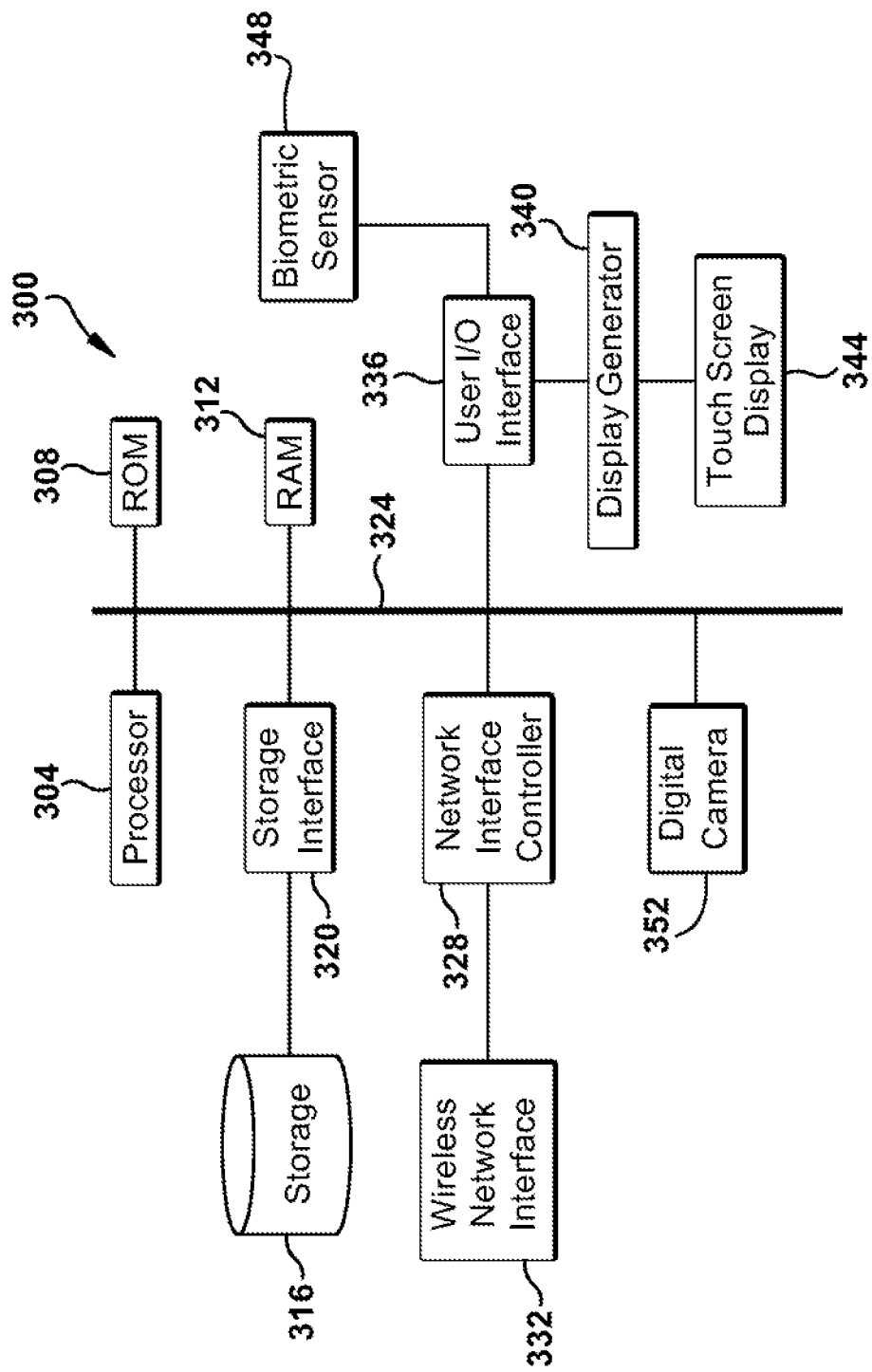
FIG. 3 illustrates an example embodiment of a digital device system.

Turning now to FIG. 3, illustrated is an example embodiment of a digital data processing device 300 such as server 128 or smartphone 148 of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. User input/output interface 336 also provides connection to biometric sensor 348, suitably comprised of a fingerprint sensor, retinal sensor, or the like, and may be used to secure device access to one or more users. Processor 304 is also in data communication with a digital camera 352, suitably used to capture images which may include encoded images such as barcodes or QR codes. Digital camera 352 is also suitably used for facial recognition, including facial recognition for securing device access.

Figure 4:
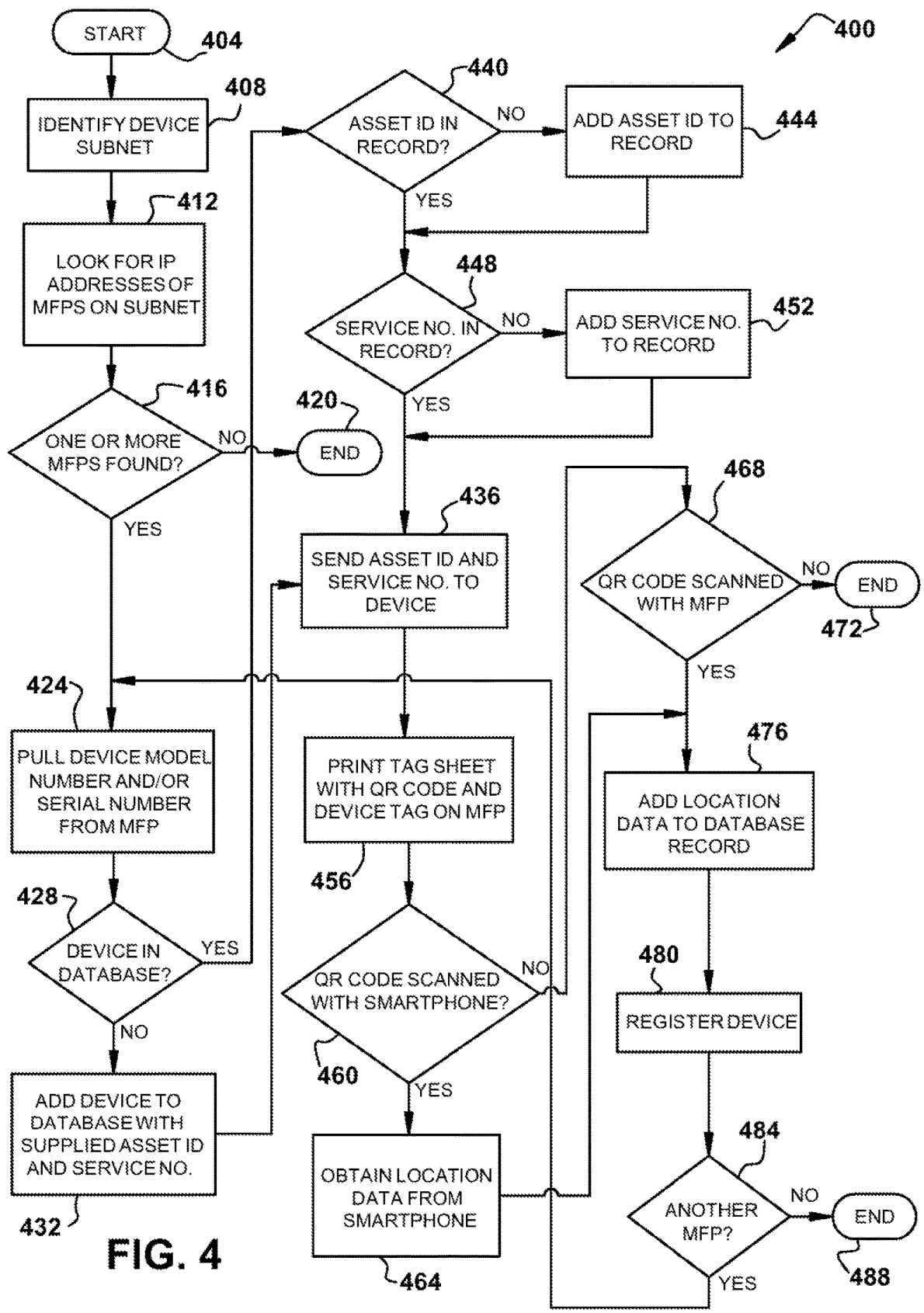
FIG. 4 illustrates a flowchart of an example embodiment of a system for remote asset tagging and management

FIG. 4 illustrates a flowchart 400 of an example embodiment of a system for remote asset tagging and management, suitably run in conjunction with server 128 of FIG. 1. The process commences at block 404 and proceeds to block 408 where a subnet is identified. Once a subnet has been identified, a search is made at block 412 for candidate devices in that subnet. A test is made at block 416 to determine if one or more candidate devices have been found. If not, the process ends at block 420.

When one or more devices have been found at block 416, a first device is selected and its model number and/or serial number is pulled from the device at block 424. A test is made at block 428 to determine if the device already exists in a database. If not, it is added to the database at block 432 and a check is made at block 440 to determine if an associate asset ID exists in the record. If not, one is added at block 444. Next, a determination is made at block 448 as to whether a service number exists in the record. If not, one is added at block 452. Next, the asset ID and service number is sent to the device at block 436 which then prints a tag sheet with a QR code and device tag on the MFP at block 456. A test is made at block 460 to determine whether the QR code has been scanned with a smartphone. If so, location data is obtained from the smartphone at block 464. If a smartphone was not used for scanning the QR code, the process proceeds to block 468 to determine whether it was scanned by the MFP. If not, the process ends at block 472. Location information from a smartphone scan or an MFP scan is added to the database record at block 476, and the device is registered at block 480. A test is made to determine whether another candidate device exists on the subnet at block 484. If so, the process returns to block 424 to process the next device. Once all devices have been addressed, the process ends at block 488.

FIG. 5 illustrates an example embodiment of a template 500, suitably forming template 136 of FIG. 1. Device information is either native to the device or added from a database as noted above. Illustrated device information includes model number 504, asset ID 506, serial number 512 and service number 516. Other service information, such as automated toner shipment notification 520, may also be supplied. Template 500 also displays QR code 524, suitably generated in the process of FIG. 4, along with instructions to scan it. Contact information is suitably supplied to assist users if needed. Instructions 532 are included directing users to affix device information to the MFP once scanning of the QR code has been completed.

FIG. 6 illustrates an example embodiment of an asset tag 600 suitably fixed on an exterior of a registered device. Device information includes model number 604, asset ID 608, serial number 612, service contact information 616 and additional information 620, such as automated toner shipment notification.

FIG. 7 illustrates an example embodiment of device registration using a smartsheet 700, suitably generated on an MFP touchscreen display. This suitably supplies confirmed or updated information for devices for which tags have been provided. Supplied smartsheet information may include inputting a serial number at block 704, a model number at block 708, and location information such as device address at block 712 and device room at block 716. Contact information may be input at block 720 and tag information supplied at block 724. A user may request a copy of their submitted information to be sent to their contact address by checking block 728 before submitting their information by selecting submit button 732.

Figure 8:
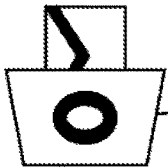
FIG. 8 illustrates an example embodiment of asset assessment workflow.

FIG. 8 illustrates an example embodiment of asset assessment workflow 800. A generated and displayed asset template 804 leads to an email 808 to commence smartsheet device registration 812 as illustrated in connection with FIG. 7, above.

Figure 9:
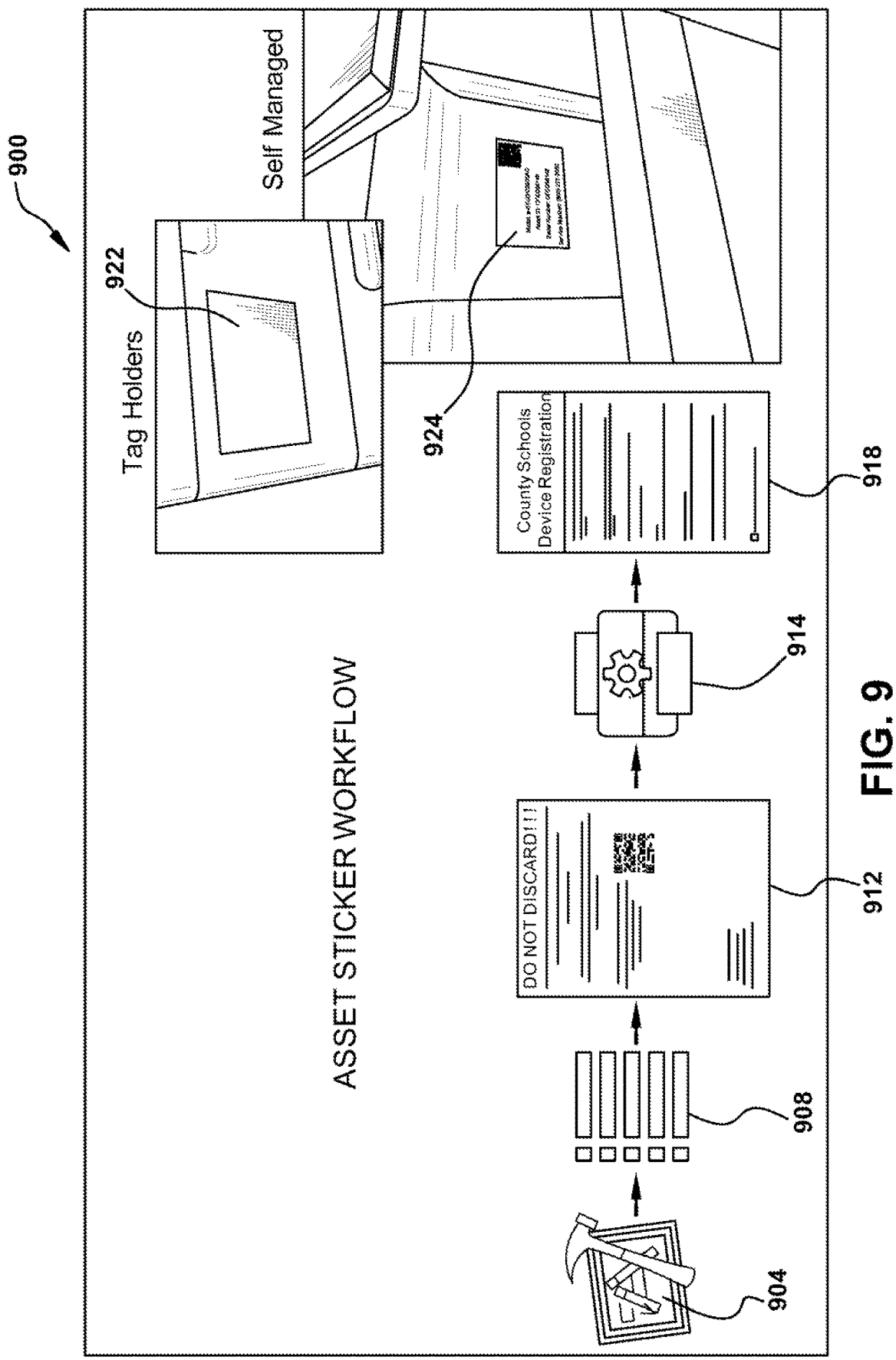
FIG. 9 illustrates an example embodiment of asset sticker workflow.

FIG. 9 illustrates an example embodiment of asset sticker workflow 900. Asset tag management system 904 obtains device information 908 to generate template 912. Template 912 is printed and then imaged, suitably by scanner 914 and leads to generation of smartsheet 918. Resultant tags are suitably displayed in tag holder 922 as appears with displayed tag 924.

Figure 10:
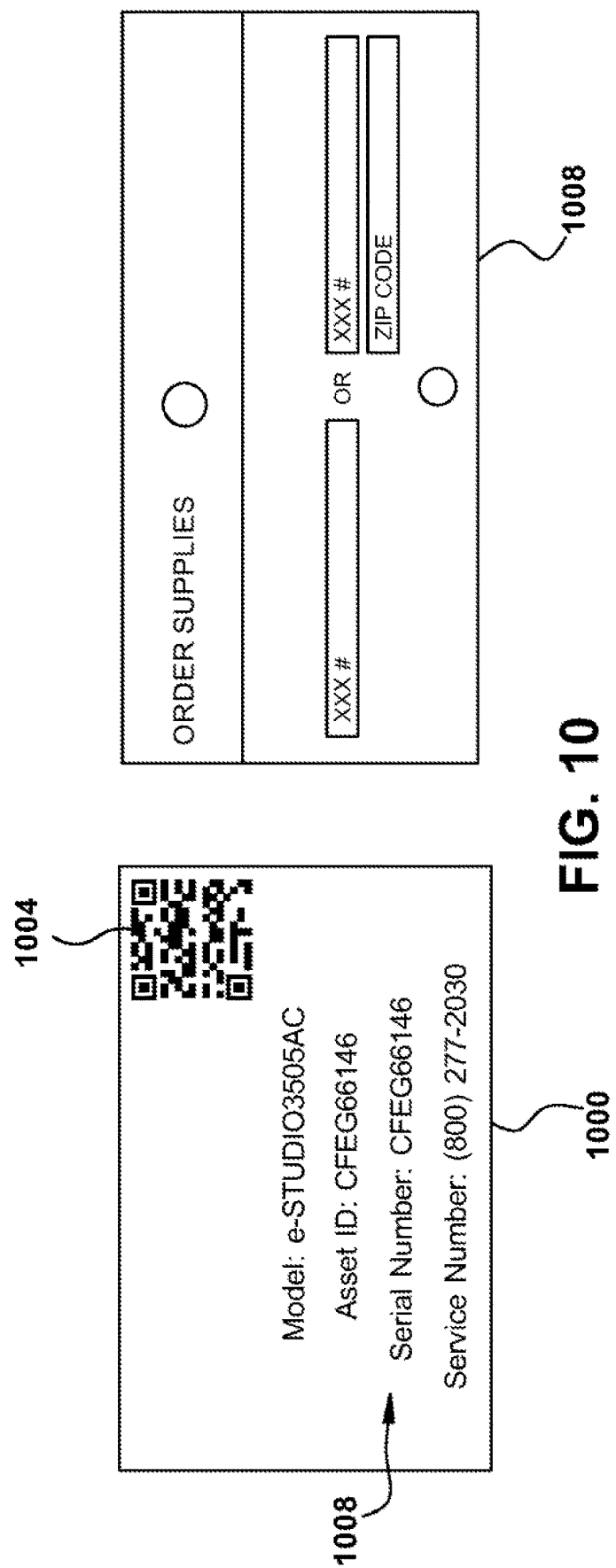
FIG. 10 illustrates an example embodiment wherein an asset tag includes a QR code in addition to device information.

FIG. 10 illustrates an example embodiment wherein asset tag 1000 includes QR code 1004 in addition to device information 1008. Scanning of QR code 1004 results in generation of a smartsheet 1008 on a device touchscreen display to facilitate quick orders, such as consumables such as paper, ink or toner.

FIG. 11 illustrates an example embodiment of an asset assessment workflow which proceeds from asset tag management system 1104 which obtains device information 1108 to generate template 1112. This template is scanned at 1116 and leads to generation of smartsheet 1170.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   one or more processors and associated memory;
   a network interface configured to receive an electronic document comprising an asset tag from a remote device service provider into the memory, the electronic document including device specific information for an associated multifunction peripheral encoded in printable optical code data;
   a printer configured to generate a printout of the asset tag, the printout including an optical code image corresponding to the optical code data;
   a scanner configured to capture a digital image of the optical code image;
   the one or more processors configured to decode the captured the optical code image to generate the device specific information; and
   the one or more processors configured register the multifunction peripheral with the remote device service provider in accordance with the decoded device specific information.

2. The system of claim 1 wherein the asset tag printout is configured to be affixed to a surface of the multifunction peripheral.

3. The system of claim 2 wherein the scanner is comprised of a portable data device or a scan engine of the multifunction peripheral.

4. The system of claim 3 wherein the portable data device is comprised of a smartphone or tablet computer configured for geolocation, and wherein registration of the multifunction peripheral includes registration of a location of the portable data device when the digital image is captured.

5. The system of claim 3 wherein the optical code is comprised of a barcode or a QR code.

6. The system of claim 5 wherein all or some of the device specific information is retrieved from the memory.

7. The system of claim 6 wherein the device specific information includes one or more of a device model number, a device serial number, a device asset ID or contact information associated with the remote device service provider.

8. A method comprising:
   receiving an electronic document comprising an asset tag from a remote device service provider into a memory via a network interface, the electronic document including device specific information for an associated multifunction peripheral encoded in printable optical code data;
   generating a printout of the asset tag, the printout including an optical code image corresponding to the optical code data;
   scanning the printout to capture a digital image of the optical code image;
   decoding the captured image to generate the device specific information, and
   registering the multifunction peripheral with a remote device service provider in accordance with the decoded device specific information in a captured digital image.

9. The method of claim 8 wherein the printout is configured to be affixed to a surface of the multifunction peripheral.

10. The method of claim 9 further comprising scanning the printout via a portable data device or a scan engine of the multifunction peripheral.

11. The method of claim 10 wherein the portable data device is comprised of a smartphone or tablet computer configured for geolocation, and wherein registering the multifunction peripheral includes registering a location of the portable data device when the digital image is captured.

12. The method of claim 10 wherein the optical code is comprised of a barcode or a QR code.

13. The method of claim 12 further comprising retrieving all or some of the device specific information is from the memory.

14. The method of claim 13 wherein the device specific information includes one or more of a device model number, a device serial number, a device asset ID or contact information associated with the remote device service provider.

15. A method comprising:
   receiving an electronic document comprising an asset tag from a remote device service provider into a memory of a multifunction peripheral via a network interface, the electronic document including device specific information for the multifunction peripheral encoded in printable optical code data;
   retrieving asset tag from the memory;
   printing the asset tag from the electronic document, the printed asset tag comprising a printout of an optical code image corresponding to the optical code data;
   affixing at least a portion of the printed asset tag on a surface of the multifunction peripheral;
   capturing an image of the optical code image with a camera associated with a smartphone or tablet computer;
   decoding the captured optical code image to generate the device specific information;
   determining a location of the smartphone or tablet; and registering the multifunction peripheral with the remote device service provider in accordance with the decoded device specific information and the location of the smartphone or tablet.

16. The method of claim 15 wherein the device specific information includes one or more of a model number, asset identifier, serial number or service number.

17. The method of claim 16 wherein the printout includes a printout of remote device service provider contact information.

18. The method of claim 15 wherein registering the multifunction peripheral includes communicating the device specific information and the location to the remote device service provider via a data connection with the smartphone or tablet.

19. The method of claim 15 further comprising encoding the device specific information into the barcode and decoding encoded device specific information in accordance with a captured barcode image.

20. The method of claim 15 further comprising receiving contact information for an administrator of the multifunction peripheral and wherein registering the multifunction peripheral includes communicating contact information to the remote device service provider.

* * * * *